No. 714,222. Patented Nov. 25, 1902.
T. F. McDONALD.
GRASS OR GRAIN CUTTER.
(Application filed Dec. 31, 1901.)
(No Model.)
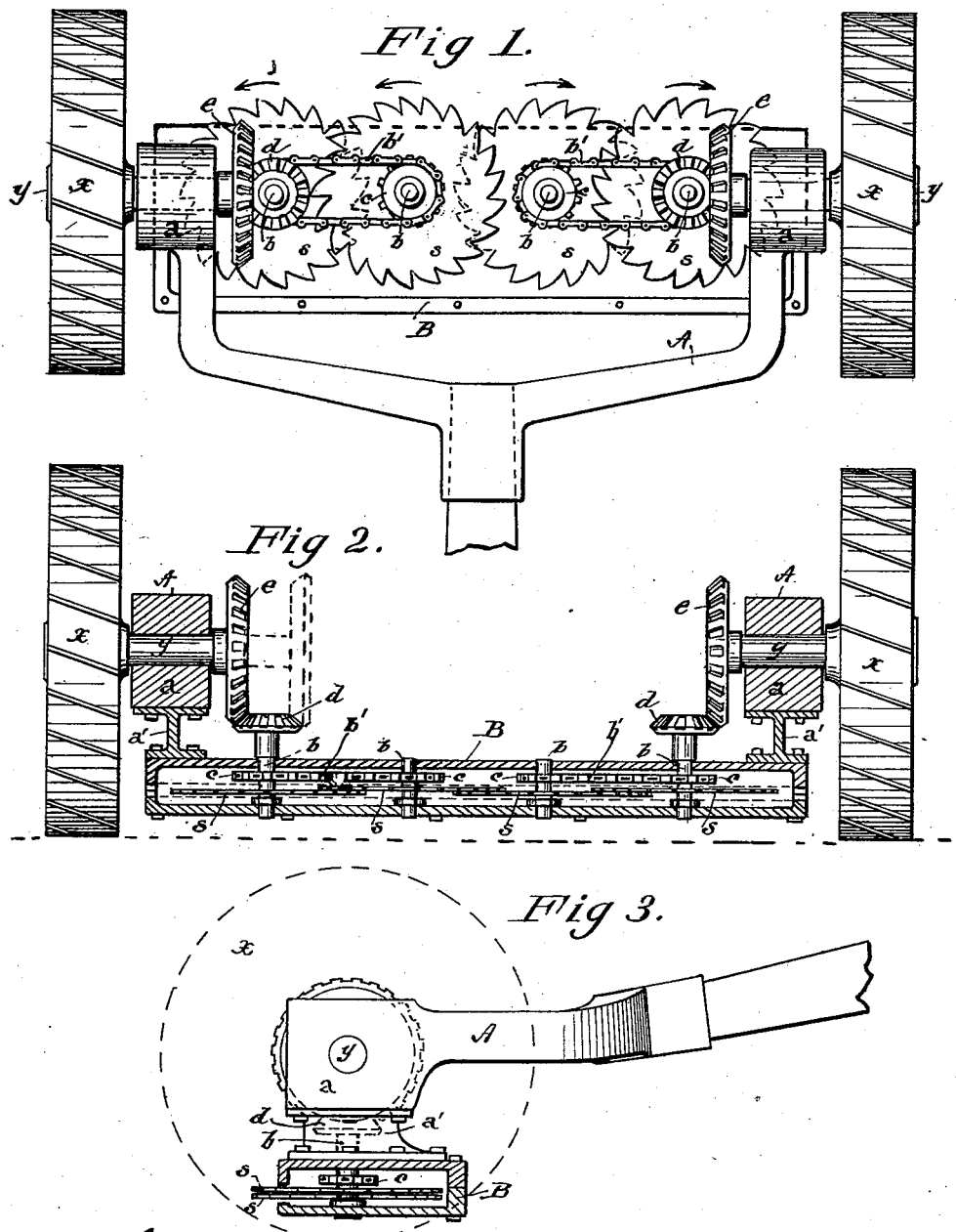
Witnesses. Inventor.
Thomas F. McDonald
by L. M. Hosea
atty

UNITED STATES PATENT OFFICE.

THOMAS F. McDONALD, OF CINCINNATI, OHIO.

GRASS OR GRAIN CUTTER.

SPECIFICATION forming part of Letters Patent No. 714,222, dated November 25, 1902.

Application filed December 31, 1901. Serial No. 87,365. (No model.)

*To all whom it may concern:*

Be it known that I, THOMAS F. MCDONALD, a citizen of the United States, residing at Cincinnati, in the county of Hamilton and State of Ohio, have invented new and useful Improvements in Grass or Grain Cutters, of which the following is a specification.

My invention relates to grass or grain cutters, its object being to produce a cutter of simple construction and efficient action that shall cut grass or grain of any height with certainty and uniformity and be easy to repair, sharpen, &c.

To this end it consists of the parts and the constructions and combinations of parts which I will hereinafter describe and claim.

My invention is illustrated in the accompanying drawings, in which—

Figure 1 is a plan view of a grass-cutter or "lawn-mower" embodying my invention with top plate of casing removed to exhibit the operative parts; Fig. 2, a vertical cross-elevation as seen from the rear, the casing and bearings of the supporting-wheels being sectioned to exhibit more fully the working parts; Fig. 3, a detail partial side elevation, sectioned through the casing to exhibit working parts.

Referring now to the drawings, A designates a bifurcated frame of the usual form employed in lawn-mowers, having in a common axis extending through the terminal enlargements of the jaws of the frame bearings $a\ a$ for the support of the frame upon wheels $x\ x$.

Bolted to and suspended by suitable downward projections $a'\ a'$ of the bearing-jaws $a\ a$ of the frame is a flat horizontal casing or boxing B, extending from side to side between the bearing-wheels, in which casing are journaled short vertical spindles $b\ b\ b\ b$, carrying circular saws $s\ s\ s\ s$, respectively, overlapping slightly and each projecting an arc of its circumference through a horizontal slit in the forward wall of the casing B, the forward edges of the slit crossing the saws about at the apex of the angles formed by their overlapping. The casing B is formed of upper and lower plates spaced suitably apart and bolted together. The saw-spindles $b$ have their journal-bearings in and between these plates.

In the illustration given there are four saws, the two nearest each bearing-wheel being driven therefrom in the following manner: Each spindle $b$ carries above its saw $s$ within the casing a sprocket-wheel $c$, the sprocket-wheels of two adjacent spindles $b$ at each end of the series being connected by an endless driving-chain $b'$. The two outer spindles are projected upward through the upper plate of the casing B, and each carries a bevel-pinion $d$ at its upper terminus. The bearing-wheels $x$ are rigidly secured, respectively, to short counter-shafts $y$, carried rotatively in and through the jaws $a\ a$ at each side, and each said shaft $y$ carries at its inner terminus a bevel-gear $e$, meshing with the bevel-pinion $d$ immediately beneath it. Thus the rotative motion of each bearing-wheel $x$ is communicated through its shaft $y$ and bevel-gear $e$ to the bevel-pinion $d$ of the outer saw of the series, and this motion is thence transmitted to the adjacent spindle by its sprocket-and-chain connection.

By the connection shown in Figs. 1 and 2 the relative motion of the saws will be as indicated by the arrows in Fig. 1, and this I prefer, as giving an outward throw to the cut grass, thus avoiding clogging.

The saws $s$ overlap consecutively in series and are arranged upon their spindles so as to run as nearly as possible in contact, the cutting edges of the teeth of the adjacent saws being oppositely beveled, so as to operate practically at the same level and as a pair of shears. The cutting edges may be also inclined backward from the true radial line, so as to produce a shearing cut.

In practice I provide the spindles $b$ with ball-bearings to insure a minimum of friction.

I claim as my invention and desire to secure by Letters Patent of the United States—

1. In a grass and grain cutter of the character described, the combination of bearing-wheels and a frame supported thereby; a saw-casing of parallel plates having a narrow slit at the front; vertical spindles journaled between the plates, the outermost of said spindles extending above the casing and having a bevel-gear fixed to the upper end; a series of circular saws arranged within the casing in pairs and in slightly-overlapping relations, and projecting a limited arc of each saw through said slit; sprocket-wheels on said spindles, and endless chains connecting the spindles in pairs and rotating the saws of each pair in the same direction; and stub-shafts one fixed to each bearing-wheel, and each of said shafts provided with a bevel-gear for engaging the corresponding gear of an outermost spindle.

2. In a grass-cutter the combination of a supporting-frame; bearing-wheels, each provided with a stub-shaft; a gear upon the inner end of each shaft; a saw-casing suspended from the main frame and having a narrow slit at the front; vertical spindles journaled in the casing, the two outermost spindles projecting above the case and provided with gear-wheels, to engage the first-named gears whereby power is directly derived from each side of the machine, saws carried by the spindles; sprocket-wheels fixed to the spindles and endless chains connecting the spindles in pairs and adapted to rotate the saws of each pair in the same direction.

In testimony whereof I have hereunto set my hand in presence of two subscribing witnesses.

THOMAS F. McDONALD.

Witnesses:
LLOYD T. BRUNSON,
CHAS. HERBERT JONES.